United States Patent [19]

Ohtsuka

[11] 4,321,516
[45] Mar. 23, 1982

[54] APPARATUS FOR DRIVING SPINDLES OF MACHINE TOOLS WITH INDUCTION MOTORS

[75] Inventor: Tsutomu Ohtsuka, Fuchu, Japan

[73] Assignee: Toshiba Kikai Kabushiki Kaisha, Tokyo, Japan

[21] Appl. No.: 168,769

[22] Filed: Jul. 11, 1980

[30] Foreign Application Priority Data

Jul. 19, 1979 [JP] Japan .................. 54/91993

[51] Int. Cl.³ ............................. G05B 19/24
[52] U.S. Cl. .................. 318/571; 318/603; 318/636
[58] Field of Search ............. 318/603, 636, 689, 571, 318/602, 432, 637, 800; 364/474

[56] References Cited

U.S. PATENT DOCUMENTS

| 3,693,064 | 9/1972 | Kiwiet | 318/571 |
|---|---|---|---|
| 4,023,085 | 5/1977 | Bishop | 318/603 X |
| 4,215,300 | 7/1980 | Schmidt | 318/602 X |
| 4,272,715 | 6/1981 | Matsumoto | 318/800 |

Primary Examiner—B. Dobeck
Attorney, Agent, or Firm—Koda and Androlia

[57] ABSTRACT

A spindle of a machine tool driven by an induction motor is controlled by a torque control system including a pulse generator coupled to the spindle, a reversible counter which counts the number of pulses, a first register connected to receive an output signal of the counter via sampling gate. The data in the first register is transferred to a second register and difference between data in the first and second registers is calculated by a calculator in the form of a register. An input device delivers a speed instruction signal and an angular position instruction signal which is added to an output signal of the first register to form a position instruction signal. A computation unit is provided to calculate respective phase currents of the induction motor in response to the speed instruction signal or the position error signal for continuously controlling motor torque or position the spindle at an instructed angular position.

2 Claims, 3 Drawing Figures

4,321,516

APPARATUS FOR DRIVING SPINDLES OF MACHINE TOOLS WITH INDUCTION MOTORS

BACKGROUND OF THE INVENTION

This invention relates to apparatus for driving the spindle of a machine tool with an induction motor, more particularly a novel torque control system for an induction motor utilized to drive the spindle of a machine tool or the like.

Where an induction motor is used to drive the spindle of a machine tool with variable speed, a change gear transmission, a pole number changing system of the induction motor, or a frequency converter which varies the frequency of AC current supplied to the motor has been used. With the change gear transmission and the pole number changing system, however, it is not only impossible to smoothly or steplessly control the motor speed but also requires a bulky and expensive speed control system. Accordingly, such system cannot enjoy the advantages of an AC motor, that is easiness of maintenance and low cost.

Furthermore, determination or orientation of the angular position of the spindle has been made with mechanical means instead of electrically controlling the motor shaft and such mechanical means complicates the construction of the spindle.

SUMMARY OF THE INVENTION

It is therefore an object of this invention to provide an improved apparatus for driving a spindle of a machine tool and can eliminate disadvantages of the prior art speed control systems described above.

Another object of this invention is to provide an improved driving apparatus of a machine tool which can control not only the speed but also the angular position of the motor shaft by using a novel electric torque control system.

According to this invention there is provided apparatus for driving a spindle of a machine tool or the like with an induction motor, characterized by comprising pulse generating means coupled to the spindle for generating a series of pulses at a short interval, a reversible counter for counting the number of the pulses, gate means which samples a count of the reversible counter with an interval shorter than a response speed of a spindle driving system including the induction motor, a first register connected to the reversible counter through the gate means for storing the count of the counter, a second register to which the content of the first register is transferred at the time of sampling, first calculating means for calculating difference between contents of the first and second registers, input means delivering a speed instruction signal and an angular position instruction signal of the spindle, a first adder responsive to the angular position instruction signal and an output signal from the first register for forming a position error signal, a transfer switch for selecting either one of the speed instruction signal and the position error signal, a second adder for adding together a signal selected by the transfer switch and an output signal of the first calculating means for forming a torque instruction signal representing a torque to be produced by the induction motor, and a second calculating means for sequentially calculating values of currents supplied to the induction motor based on an output signal of the first register and the torque instruction signal.

DESCRIPTION OF THE PREFERRED EMBODIMENT

To have a better understanding of this invention the principle of controlling the torque of an induction motor will firstly be described.

For simplifying the description, the following description concerns a two phase induction motor, but it should be understood that the invention is also applicable to induction motors of three or more phases.

Figure 1:
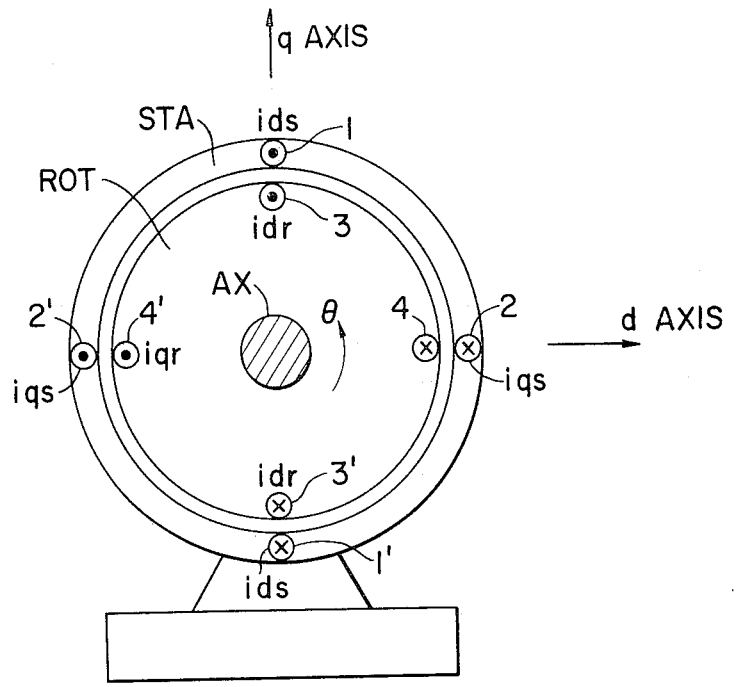
FIG. 1 is a diagrammatic cross-sectional view of a two phase induction motor useful to explain the torque control system utilized in this invention.
Figure 2:
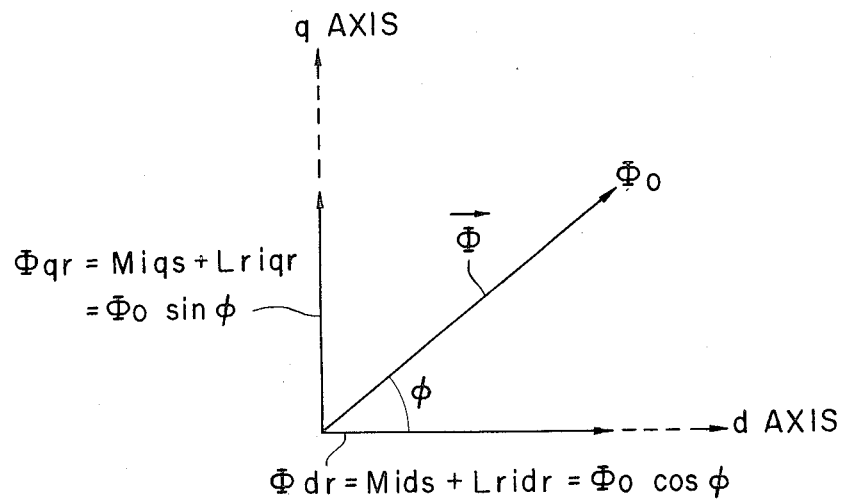
FIG. 2 is a graph showing a relationship between fluxes induced in the motor shown in FIG. 1.

FIG. 1 is a diagrammatic cross-sectional view of a two phase squirrel cage type two phase induction motor taken along a plane perpendicular to the output shaft AX of the motor, and shows the cross-sections of one winding 1-1' of the stator STA and of the other winding 2-2' orthogonal to the winding 1-1'. A direction of a plane containing the winding 1-1' is termed a q axis direction, while a direction of a plane containing the winding 2-2' a d axis direction. The currents flowing through the stator windings 1-1' and 2-2' and 1-1' are designated by ids and iqs respectively and their directions are shown by dots and crisscrosses.

A rotor current is induced in the rotor winding ROT by the electromagnetic induction of the stator currents ids and iqs. Taking one rotor winding 3-3' and the other rotor winding 4-4' ninety electrical degrees apart from the rotor winding 3-3', it is assumed that the rotor current is expressed by rectangular coordinate components of rotor currents idr and iqr flowing through rotor windings 3-3' and 4-4' respectively.

The magnetic flux $\Phi dr$ produced in the rotor ROT in the direction of the d axis by the currents ids and idr respectively flowing through stator windings 1-1' and 3-3' and the magnetic flux $\Phi qr$ produced in the direction of q axis by the currents iqs and iqr flowing through the stator windings 2-2' and 4-4' respectively are given by the following equations.

$$\left.\begin{array}{l}\Phi dr = M \cdot ids + Lr \cdot idr \\ \Phi qr = M \cdot iqs + Lr \cdot iqr\end{array}\right\} \quad (1)$$

where M represents the mutual inductance between stator and rotor windings and Lr the self inductance of the rotor winding.

Assume now that the rotor ROT is rotating at an angular speed of $\dot{\theta}$ (radians/sec.) in the counterclockwise direction as viewed in FIG. 1 and that windings 3-3' and 4-4' are short circuited, the following equations hold.

$$\left.\begin{array}{l}-\dot{\theta}\Phi qr - \frac{d\Phi dr}{dt} = Rr \cdot idr \\ \dot{\theta}\Phi dr - \frac{d\Phi qr}{dt} = Rr \cdot iqr\end{array}\right\} \quad (2)$$

where Rr represents the resistance of the rotor winding.

Where the flux has a constant value $\Phi_o$ and makes an angle $\phi$ with respect to the d axis, and where such magnetic flux $\vec{\Phi}$ links the rotor winding, $\Phi dr$ and $\Phi qr$ are given by the following equations.

$$\begin{rcases} \Phi dr = \Phi_o \cdot \cos\phi \\ \Phi qr = \Phi_o \cdot \sin\phi \end{rcases} \quad (3)$$

From equations (1), (2) and (3), the stator currents ids and iqs are given by the following equations wherein $\dot{\Phi} = d\phi/dt$, $$\begin{rcases} ids = \dfrac{\Phi_o}{M}\cos\phi - \dfrac{Lr}{M\cdot Rr}(\dot{\phi} - \dot{\theta})\Phi_o \cdot \sin\phi \\ iqs = \dfrac{\Phi_o}{M}\sin\phi - \dfrac{Lr}{M\cdot Rr}(\dot{\phi} - \dot{\theta})\Phi_o \cdot \cos\phi \end{rcases} \quad (4)$$

Conversely, equations (3) can be derived out from equations (1), (2) and (4) so that when currents ids and iqs given by equations (4) are passed through the stator winding the d axis component and the q axis component $\Phi dr$ and $\Phi qr$ of the constant value $\Phi_o$ can be obtained as shown by equations (3).

The torque $T_e$ of the induction motor shown in FIG. 1 is expressed by the following equation:

$$T_e = KT \cdot (\Phi qr \cdot idr - \Phi dr \cdot iqr) \ldots \quad (5)$$

where KT represents a constant.

From equations (2), (3) and (5) we obtain $$T_e = \dfrac{KT \cdot \Phi_o^2}{Rr}(\dot{\phi} - \dot{\theta}) \quad (6)$$

Substitution of equation (6) into equations (4) derives out the following equations.

$$\begin{rcases} ids = \dfrac{\Phi_o}{M}\cos\phi - \dfrac{Lr}{M\cdot KT \cdot \Phi_o} \cdot T_e \cdot \sin\phi \\ iqs = \dfrac{\Phi_o}{M}\sin\phi - \dfrac{Lr}{M\cdot KT \cdot \Phi_o} \cdot T_e \cdot \sin\phi \end{rcases} \quad (7)$$

By integrating both terms of equation (6) we obtain $$\phi = Rr/KT \cdot \Phi_o^2 \int T_e dt + \theta \ldots \quad (8)$$

When a desired instruction torque $T_e$ of the induction motor is obtained from the equations described above, this torque $T_e$ is substituted in equations (7) and (8) and when the stator currents ids and iqs thus obtained are passed through the stator winding the output torque of the induction motor would be equal to the instructed torque $T_e$. In this manner, when the desired instructed torque $T_e$ shown in equations (7) and (8) is varied instantaneously, the motor would instantly produce a torque just equal to the instructed torque $T_e$. This relation always holds for any number of revolutions or the angular velocity of the motor thus enabling torque control of an induction motor with a quick response just like a direct current motor.

When the sign of the instructed torque $T_e$ given by equations (7) and (8) is negative, the induction motor would produce a negative torque. When the above described principle is applied to a three phase induction motor, the currents i1a, i1b and i1c flowing through respective stator phase windings must satisfy the following equations (9) and equation (8) described above.

$$\begin{rcases} ila = \dfrac{\Phi_o}{M}\cdot\sin\phi + \dfrac{Lr}{M\cdot KT\cdot \Phi_o}\cdot T_e \cdot \cos\phi \\ ilb = \dfrac{\Phi_o}{M}\cdot\sin(\phi - \tfrac{2}{3}\pi) + \dfrac{Lr}{M\cdot KT\cdot \Phi_o}\cdot T_e \cdot \cos(\phi - \tfrac{2}{3}\pi) \\ ilc = \dfrac{\Phi_o}{M}\cdot\sin\left(\phi - \tfrac{4}{3}\pi\right) + \dfrac{Lr}{M\cdot KT\cdot \Phi_o}\cdot T_e \cdot \cos\left(\phi - \tfrac{4}{3}\pi\right) \end{rcases} \quad (9)$$

The invention is characterized in that the torque control system for an induction motor is applied to the spindle of a machine tool or the like.

Figure 3:
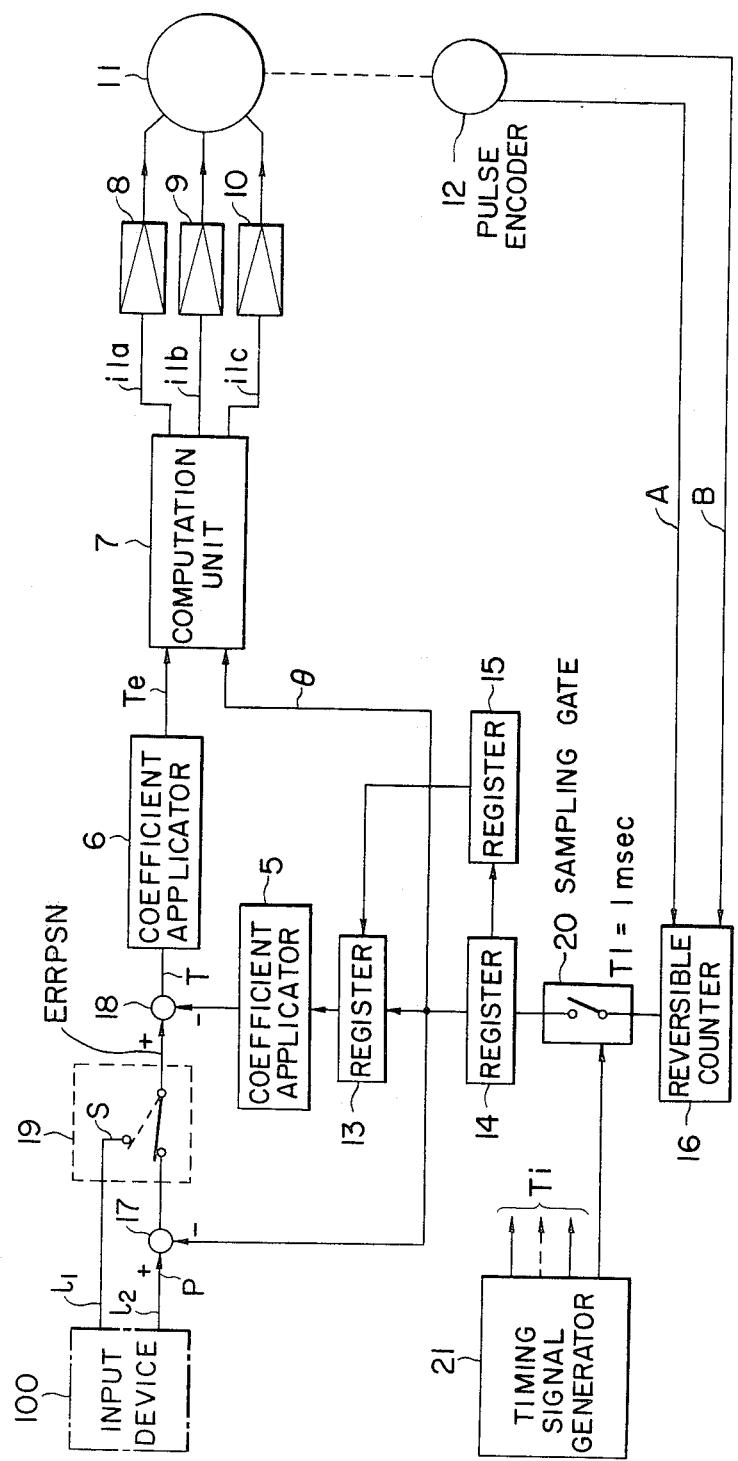
FIG. 3 is a block diagram showing one embodiment of the present invention.

A preferred embodiment of this invention shown in FIG. 3 comprises a pulse encoder 12 coupled to the spindle of a machine tool, not shown, driven by a three phase induction motor 11 to be rotated thereby at a speed ratio of 1:1. The pulse encoder 12 is constructed to generate 3,600 pulses for one revolution of the spindle, so that each pulse corresponds to 0.1° of the angular rotation of the spindle. In other words, as the spindle rotates 100°, 1000 pulses are generated. The pulse encoder 12 produces 90° dephased pulses A and B (hereinafter designated as A phase and B phase, respectively), and these pulses are applied to a reversible counter 16 which is constructed such that its count is increased by the pulse A and decreased by the pulse B. The reversible counter 16 has 3,600 steps, so that its count corresponds to any angular position in one revolution of the spindle thus representing the angular position of the spindle.

The content of the reversible counter 16 is sampled with a period of 1/1000 second and a timing signal Ti for a timing instruction is applied to a sampling gate circuit 20 from a timing signal generator 21. When the gate circuit 20 is enabled, the content of the reversible counter 16 is transferred to a register 14. Data inputted from an input device 100, for example a tape reader, are given in absolute values of instructions during one sampling.

The input device 100 applies a speed data S on line l1 while an angular position data P on line l21 and a transfer switch 19 is provided to effect transfer between lines l1 and l2. In line l2 is included an adder 17 which subtracts output $\theta$ from input P from the input device 100 to produce an output, i.e., a position error data ERRPSN. To the movable contact of the transfer switch 19 is connected an adder 18 which subtracts the output of a coefficient applicator 5 from the position error data ERRPSN for producing a signal T corresponding to the motor torque. The signal T is converted into a signal $T_e$ corresponding to an instructed torque by a coefficient applicator 6. This signal $T_e$ is applied to a computation unit 7 together with the output $\theta$ from the register 14.

A register 13 calculates a speed based on an angular position data NEWPSN sampled at an instant and a data OLDPSN previously sampled and holds the calculated data. The outputs of the computation unit 7 are applied to amplifiers 8, 9 and 10 which amplify respective stator currents of the motor. Since the range of counts of the reversible counter 16 is limited within 0–3599, the data applied to register 13 are calculated in the following manner by taking into consideration the direction of rotation of the motor.

Although one revolution of the spindle is divided into 3600 positions, the amount of variation during one sampling period is limited herein to 1800. Accordingly, the maximum number of revolutions of the spindle that can be controlled is $$1800/3600 \times 1000 \times 60 = 30{,}000 \text{ rpm}$$

which is sufficiently high for the spindle control of an ordinary machine tool. One example of calculating the speed will now be described. Thus, X is defined as follows.

$$X = \text{NEWPSN} - \text{OLDPSN}$$

where $X \geq 1800$, $$\text{SPD} = X - 3600$$

and where $X \geq -1800$, $$\text{SPD} = X + 3600$$

where $X < |\pm 1800|$, $$\text{SPD} = X.$$

For example, when OLDPSN=100, NEWPSN=2500, and X=2500−100=2400 (this means that X≧1800), then SPD=2400−3600=−1200. In other words, the spindle has been rotated in the negative direction at a speed of 120°/ms.

On the other hand, when OLDPSN=2500, NEWPSN=100 and X=100−2500=−2400 (this means that X≧−1800), then SPD=−2400+3600=1200. This means that the spindle has been rotated in the positive direction at a speed of 120°/msec. The output of the register 13 calculated as above described is compared with the signal ERRPSN by adder 18 to obtain signal T corresponding to the torque which is converted into a signal $T_e$ by the coefficient applicator 6 and then applied to the computation unit 7 together with signal $\theta$ to calculate equations (8) and (9).

These calculations can be made with logic circuits but when the invention is applied to a numerical control system they can be made with programs of an electronic computor. The detail of the control with an electronic computor is disclosed in FIG. 3 of a copending U.S. patent application Ser. No. 1014 filed on Jan. 4, 1979, now U.S. Pat. No. 4,272,715, so that in FIG. 3 of the instant application, only the timing signal generator 21 is shown to show that it generates various timing signals Ti utilized in the computation unit 7.

Analogue signals i1a, i1b and i1c calculated by the computation unit 7 and then converted into analogue quantities corresponding to respective stator phase currents are supplied to the corresponding stator windings through power amplifiers 8, 9 and 10. Upon completion of a series of calculations, the output of the register 14 is transferred to register 15. In this example, the time necessary to perform a series of calculations is 1 ms.

As the power amplifiers 8, 9 and 10 are required to have a short response speed, pulse width modulation type power amplifiers are used in which transistors are used as the main current control elements.

As above described, according to this invention, the current of a three phase induction motor is controlled to rotate the same thus rotating the spindle.

In the case of positioning, the transfer switch 19 is thrown to the lower side and when the position instruction P coincides with signal $\theta$, motor 11 is stopped thus completing the positioning operation of the angular position of the spindle.

To perform speed control of the motor the transfer switch 19 is thrown to the upper side to continuously apply the speed instruction S from the input device 100 to adder 18 and the motor 11 is rotated until the instruction S disappears.

The mechanical transfer switch 19 may be substituted by transistor switching elements controlled from outside.

In FIG. 3 a circuit extending from pulse encoder 12 through reversible counter 16, register 14 and adder 17 constitutes a position feedback loop whereas a circuit extending from pulse generator 12, reversible counter 16, registers 14, 13 and 15, coefficient applicator 5 and adder 18 constitutes a speed feedback circuit which inproves the stability of the driving system. In the prior art, the latter loop utilizes a tachometer generator.

As above described, according to this invention, there is provided a computation unit which calculates the stator current of an induction motor in an extremely short time and a torque instruction $T_e$ applied to the computation unit is calculated from a speed instruction or an angular position instruction given from such input device as a tape reader, and a data obtained by a reversible counter which counts the number of pulses generated by a pulse encoder coupled to the spindle. Thus the invention makes it possible to smoothly control the number of revolutions of the spindle of a machine tool or the like, in a stepless manner, as well as the angular position or orientation of the spindle with only electric means. As a consequence, it is possible to replace a DC motor with an induction motor which is cheaper and can readily be maintained. Moreover, the invention eliminates the use of expensive and bulky mechanical orientation mechanism.

I claim:

1. Apparatus for driving a spindle of a machine tool or the like with an induction motor comprising:
   pulse generating means coupled to said spindle for generating a series of pulses at a short interval;
   a reversible counter for counting the number of said pulses;
   gate means which samples a count of said reversible counter with an interval shorter than a response speed of a spindle driving system including said induction motor;
   a first register connected to said reversible counter through said gate means for storing the count of said counter;
   a second register to which a content of said first register is transferred at the time of sampling;
   first calculating means for calculating difference between contents of said first and second registers;
   input means delivering a speed instruction signal and an angular position instruction signal of said spindle;
   a first adder responsive to said angular position instruction signal and an output signal from said first register for forming a position error signal;
   a transfer switch for selecting either one of said speed instruction signal and said position error signal;

a second adder for adding together a signal selected by said transfer switch and an output signal of said first calculating means for forming a torque instruction signal representing a torque to be produced by said induction motor; and second calculating means for sequentially calculating values of currents supplied to said induction motor based on an output signal of said first register and said torque instruction signal.

2. The apparatus as defined in claim 1 wherein said pulse generating means, said reversible counter, said gate means, said first register, said first and second calculating means are connected to constitute a position feedback loop and wherein said pulse generating means, said reversible counter, said first and second registers, said first calculating means and said second adder are connected to constitute a speed feedback system.

* * * * *